US006452713B1

(12) United States Patent
White

(10) Patent No.: US 6,452,713 B1
(45) Date of Patent: Sep. 17, 2002

(54) DEVICE FOR TUNING THE PROPAGATION OF ELECTROMAGNETIC ENERGY

(75) Inventor: Christopher A. White, Basking Ridge, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/752,240

(22) Filed: Dec. 29, 2000

(51) Int. Cl.[7] .................................................. G02F 1/01
(52) U.S. Cl. ........................................ 359/322; 333/159
(58) Field of Search ......................... 359/322; 333/159; 428/105; 385/129; 372/66

(56) References Cited

U.S. PATENT DOCUMENTS

| | | | | |
|---|---|---|---|---|
| 5,221,957 | A | 6/1993 | Jannson et al. | 356/301 |
| 5,389,943 | A | 2/1995 | Brommer et al. | 343/909 |
| 5,406,573 | A | 4/1995 | Ozbay et al. | 372/43 |
| 5,471,180 | A | 11/1995 | Brommer et al. | 333/202 |
| 5,541,614 | A | 7/1996 | Lam et al. | 343/792.5 |
| 5,600,342 | A | 2/1997 | Pikulski et al. | 343/909 |
| 5,600,483 | A | 2/1997 | Fan et al | 359/344 |
| 5,739,796 | A | 4/1998 | Jasper et al. | 343/895 |
| 5,784,400 | A | 7/1998 | Joannopoulos et al. | 372/96 |
| 5,802,236 | A | 9/1998 | Digiovanni et al. | 385/127 |
| 5,818,309 | A | 10/1998 | Santos | 333/176 |
| 5,955,749 | A | 9/1999 | Joannopoulos | 257/98 |
| 5,973,823 | A | 10/1999 | Koops et al. | 359/322 |
| 5,999,308 | A | 12/1999 | Nelson et al. | 359/321 |
| 6,002,522 | A | 12/1999 | Todori | 359/573 |
| 6,093,246 | A | 7/2000 | Lin et al. | 117/928 |

OTHER PUBLICATIONS

A. A. Zakhidov et al., "Carbon Structures With Three–Dimensional Periodicity At Optical Wavelengths", *Science*, vol. 282, Oct. 30, 1998, pp. 897–901.

P. St J Russell. "Photonic Band Gaps", *Physics World*, Aug. 1992, pp. 37–42.

*Primary Examiner*—Georgia Epps
*Assistant Examiner*—Richard Hanig
(74) *Attorney, Agent, or Firm*—Ozer M. N. Teitelbaum

(57) ABSTRACT

A device for tuning the propagation of electromagnetic energy. The device includes a first and a second periodic dielectric structure. One of the periodic dielectric structures is movable with respect to the other periodic dielectric structure to modify a composite propagating wave characteristic of the device.

16 Claims, 4 Drawing Sheets

*FIG. 1* A (Prior Art)
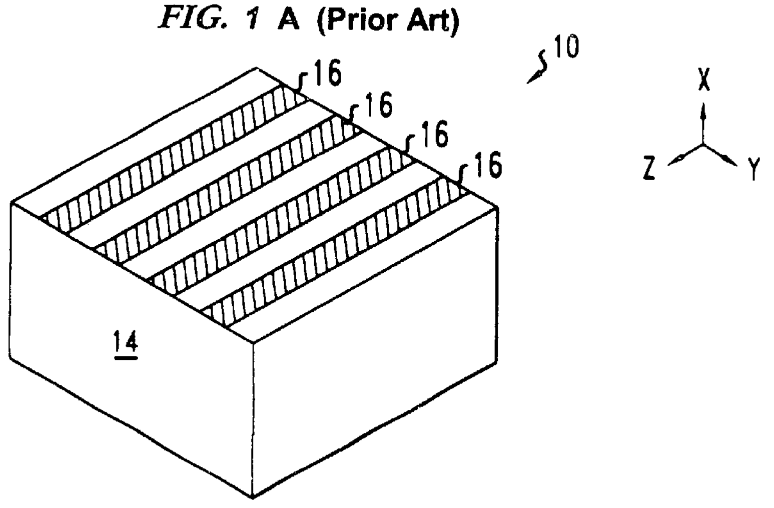
*FIG. 1* B (Prior Art)
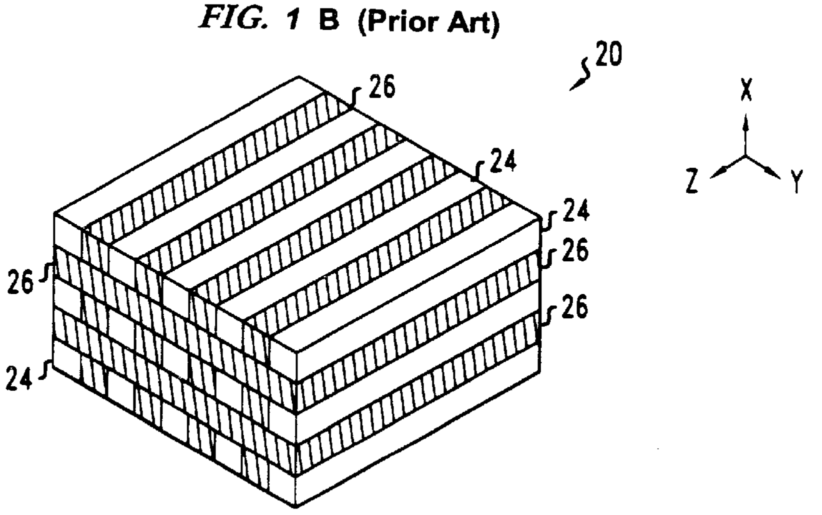
*FIG. 1* C (Prior Art)
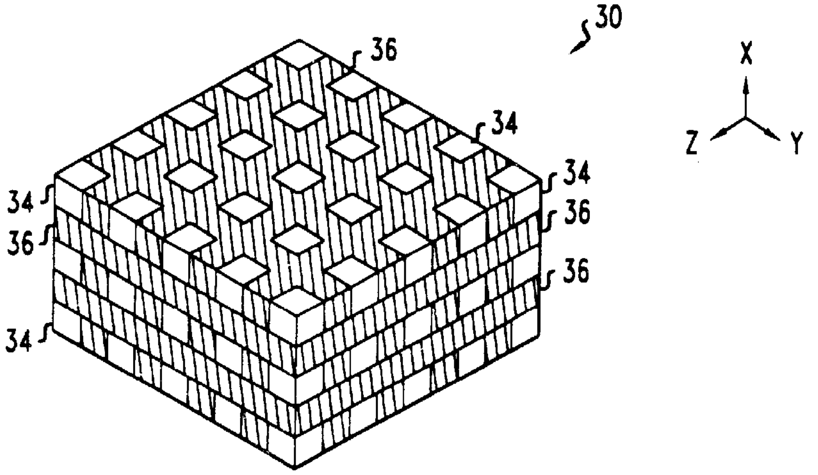

DEVICE FOR TUNING THE PROPAGATION OF ELECTROMAGNETIC ENERGY

FIELD OF THE INVENTION

The present invention relates to periodic dielectric structures, generally, and more particularly to a device for tuning the propagation of electromagnetic energy.

BACKGROUND OF THE INVENTION

Numerous applications have been devised for photonic crystals. A photonic crystal exhibits propagating wave characteristics (as described, for example, with a photonic band structure) for controlling the propagation of electromagnetic ("EM") energy therethrough. A photonic crystal is realized by a three-dimensional dielectric structure having periodic variations in its refractive index. These periodic variations may be formed in one-, two- or all three-dimensions of the dielectric structure. As such, a photonic crystal may control the propagation of EM energy, in any direction, through the periodic dielectric structure.

One application of increasing interest for photonic crystals is a device for controlling the propagation of EM energy. The propagating wave characteristics of a periodic dielectric structure may include a photonic bandgap, for a specific orientation (i.e., direction) of the propagation of the received EM energy. A photonic bandgap suppresses a band of wavelengths from propagating through a photonic crystal. Photonic crystals and their periodic dielectric structures, however, are static elements. A periodic dielectric structure's propagating wave characteristics and photonic bandgap are fixed. Consequently, the propagating wave characteristics may not be altered without modifying the periodic dielectric structure.

Several solutions have been proposed to alter or tune the propagating wave characteristics of a photonic crystal by modifying the periodic dielectric structure. These solutions heat or stretch the periodic dielectric structure, for example, to arrive at the desired propagating wave characteristics. Heating or stretching the periodic dielectric structure, however, requires too much time for some applications.

Consequently, a demand exists for a device for controlling the propagation of EM energy using a photonic crystal in which the periodic dielectric structure is tuned expeditiously.

SUMMARY OF THE INVENTION

In accordance with the present invention, we have solved the aforementioned problems of the prior art by employing a first and a second periodic dielectric structure, one of which is movable with respect to the other. For present purposes, the term movable and its derivatives means mechanically moving, positioning and/or rotating one periodic dielectric structure with respect to the other, in contradistinction to the prior approach of heating or stretching the periodic dielectric structure. Each periodic dielectric structure exhibits propagating wave characteristics. For the purposes of the present invention, the propagating wave characteristics of periodic dielectric structure include, but are not limited to reflectivity, transmissivity, waveguiding, and refractive index. By aligning one periodic dielectric structure with the other periodic dielectric structure, a resultant or composite propagating wave characteristic is created. Consequently, as one dielectric structure is moved with respect to the other, the composite propagating wave characteristic is altered.

BRIEF DESCRIPTION OF THE DRAWINGS

The present invention will be better understood from reading the following description of non-limiting embodiments, with reference to the attached drawings, wherein below:

FIGS. 1(*a*), 1(*b*) and 1(*c*) are perspective views of known one-, two- and three-dimensional photonic crystals;

Figure 2A:
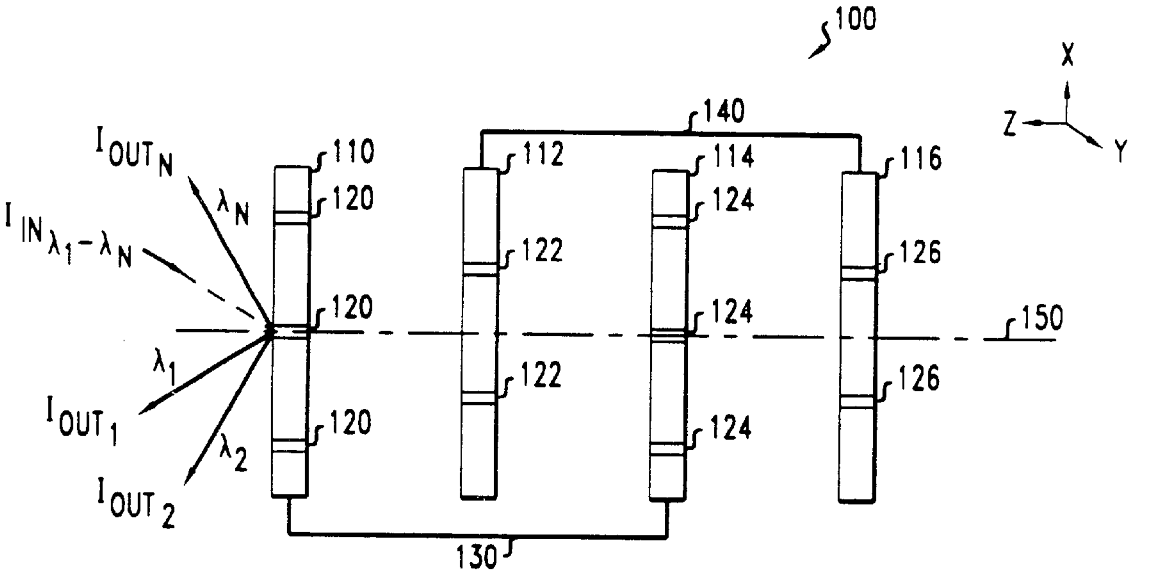
FIG. 2(*a*) is a cross-sectional view and FIG. 2(*b*) is a perspective view of an embodiment of the present invention.

It should be emphasized that the drawings of the instant application are not to scale but are merely schematic representations, and thus are not intended to portray the specific parameters or the structural details of the invention, which can be determined by one of skill in the art by examination of the information herein.

DETAILED DESCRIPTION OF THE PRESENT INVENTION

Photonic crystals exhibiting propagating wave characteristics and photonic bandgaps therein are known. For example, see P.S.J. Russell, "Photonic Band Gaps," *Physics World,* Volume 37, Aug. 1992, I. Amato, "Designing Crystals That Say No To Photonics," *Science,* Volume 255, p. 1512 (1993), J. Joannopoulos et al., "Photonic Crystals: Molding the Flow of Light," Princeton University Press (1995), U.S. Pat. Ser. No. 5,389,943 issued on Feb. 14, 1995 to Brommer et al., U.S. Pat. Ser. No. 5,471,180 issued on Nov. 28, 1995 to Brommer et al, and U.S. Pat. Ser. No. 5,999,308 issued on Dec. 7, 1999 to Joannopoulos et al.

As shown in FIGS. 1(*a*) through 1(*c*), photonic crystals may be realized by various periodic one-, two- or three-dimensional dielectric structures. One-, two-and three-dimensional dielectric structures in this context refers to the number of dimensions having periodic variations. With respect to FIG. 1(*a*), a periodic one- dimensional dielectric structure 10 is shown. Structure 10 comprises a substrate 14 having a number of identical layers 16—the index of refraction of the layers 16 being distinct from that of substrate 14. As such, structure 10 exhibits periodic variations in its refractive index along its y-axis. Similarly, with respect to FIG. 1(*b*), a periodic two- dimensional dielectric structure 20 is shown. Structure 20 exhibits periodic variations in its refractive index along its x- and y-axes as a result of the arrangement of substrate 24 and layers 26.

A periodic three-dimensional dielectric structure 30 is shown in FIG. 1(*c*). Structure 30 exhibits periodic variations in its refractive index along its x-, y- and z-axes from the arrangement of substrate 24 and layers 26.

As stated hereinabove, propagating wave characteristics are formed in a dielectric structure exhibiting periodic variations in its refractive index. Propagating wave characteristics may include at least one photonic bandgap, depending on the orientation (i.e., direction) of the propagation of the received electromagnetic ("EM") energy. Consequently, wavelength bands of EM energy falling within the photonic bandgap are suppressed from propagating through the photonic crystal, and thereby reflected from the photonic crystal. In contrast, wavelength bands of EM energy outside the photonic bandgap propagate through the photonic crystal according to the crystal's propagating wave characteristic (s).

EM energy may be reflected or transmitted at the surface of a conventional optical device, depending on its boundary conditions. Propagating wave characteristics or photonic band structure, however, expresses the solutions to Maxwell's equations which satisfy the boundary conditions in a photonic crystal. Consequently, by changing the boundary conditions in a photonic crystal, the propagating wave characteristics may be altered such that the propagation of EM energy through the photonic crystal may be modified.

Figure 2B:
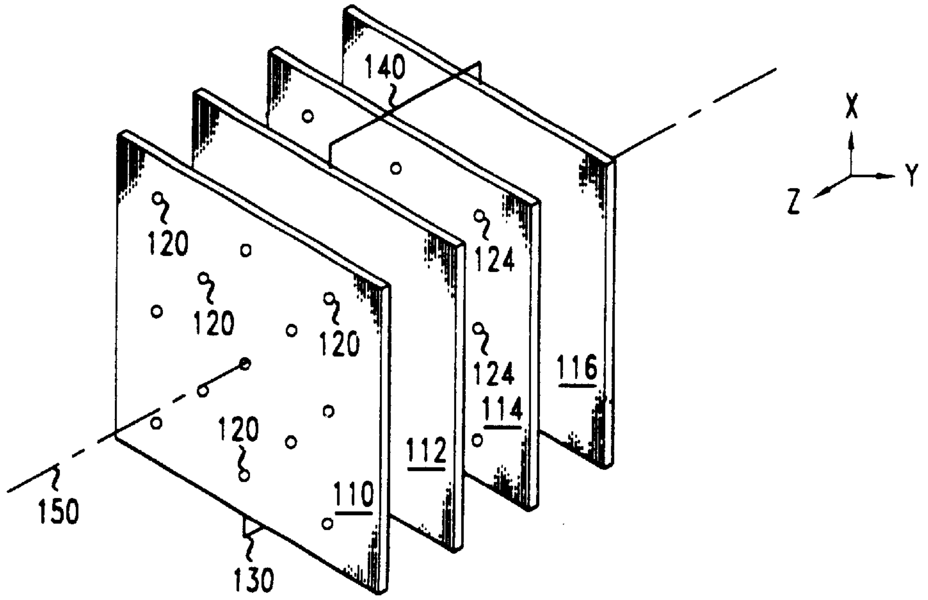

Referring to FIGS. 2(*a*) and 2(*b*), an embodiment of the present invention is illustrated. Here, a device 100 is shown for tunably filtering EM energy. Device 100 comprises a three-dimensional periodic dielectric structure having a resultant or composite propagating wave characteristic. The three-dimensional periodic dielectric structure is formed from a number of properly arranged and aligned two-dimensional periodic dielectric structures. Each two-dimensional periodic dielectric structure has propagating wave characteristics such that the composite propagating wave characteristic is created from the arrangement and alignment of the number of two-dimensional periodic dielectric structures forming the three-dimensional periodic dielectric structure. The three-dimensional dielectric structure is mechanically adjustable to alter the composite propagating wave characteristics of device 100. By altering the composite propagating wave characteristics of device 100, the propagation of EM energy may be controlled or tuned.

In contrast with the known art, the three-dimensional dielectric structure of device 100 is mechanically adjusted to tunably control the propagation of wavelength bands, $\lambda_1$ through $\lambda_N$, from received EM energy, $I_{IN}$. Each wavelength band of the received EM energy diffracts from device 100 at a unique angle by mechanically adjusting the three-dimensional dielectric structure. Consequently, a selected wavelength band, $\lambda_2$, may be directed or steered using device 100 to a desired location by manipulating its angle of diffraction. The remaining wavelength bands, $\lambda_1$, and $\lambda_3$ through $\lambda_N$, propagate in directions other than that of the desired wavelength band. If device 100 includes an absorbing layer for absorbing the EM energy from within these remaining wavelength bands, device 100 may function as an EM filter. In other applications of the present invention, these remaining wavelength bands may be ignored or employed for additional purposes apparent to skilled artisans upon reviewing the instant disclosure.

The mechanically adjustable three-dimensional dielectric structure of device 100 is formed by at least two photonic crystals—at least one of the photonic crystals having periodic variations in its refractive index along at least two of its axes. As illustrated, device 100 comprises four (4) photonic crystals, 110, 112, 114 and 116. Each photonic crystal, 110, 112, 114 and 116, comprises a periodic two-dimensional dielectric structure having periodic variations in its refractive index along the x- and the y-axes. The periodic two-dimensional variations of photonic crystals, 110, 112, 114 and 116, may be realized by a number of periodically spaced scattering elements, defects, cavities or voids, 120, 122, 124 and 126, formed within a respective substrate—the index of refraction of the respective substrate having a first value, $n_1$, while each of the scattering elements, defects, cavities or voids, 120, 122, 124 and 126, corresponds with a second index of refraction, $n_2$. To realize the variable diffractive properties of device 100, the shape, spacing and dimensions of each of the scattering elements, defects, cavities or voids, 120, 122, 124 and 126, is generally on the order of the wavelength of the EM energy. Detailed computations can specifically determine the nature of the structure for the desired application. The number, spacing and arrangement of the periodically spaced scattering elements, defects, cavities or voids, 120, 122, 124 and 126, are readily determinable to skilled artisans to derive a desired composite propagating wave characteristic for device 100.

The scattering elements, defects, cavities or voids, form an array in the x-y plane of each photonic crystal. For an exemplary illustration, see FIG. 4(*a*). The array of scattering elements, defects, cavities or voids may be arranged to form a circular, rectangular or hexagonal configuration, for example. Moreover, the scattering elements, defects, cavities or voids of the array may be identically realized by any one of a number of shapes—i.e., a circle, rectangle or hexagon, for example.

Photonic crystals 110, 112, 114 and 116, may have identical periodic variations in the x- and y-axes such that their structures are equivalent. However, alternate arrangements are also employable. As shown, device 100 comprises two groupings of photonic crystals having identical periodic variations in the x- and y-axes. In forming the mechanically adjustable three-dimensional dielectric structure, the groupings are periodically sequenced. As such, device 100 includes a first grouping of photonic crystals, 110 and 114, having identical periodic variations, as well as a second grouping of photonic crystals, 112 and 116, having identical periodic variations. The photonic crystals of each grouping move in unison when device 100 is mechanically adjusted. Consequently, the mechanically adjustable three-dimensional dielectric structure is also periodic in the z-axis within the array of scattering elements, defects, voids or cavities. Each grouping of photonic crystals is moved in unison by the inclusion of a first and second coupling means, 130 and 140. First and second coupling means, 130 and 140, may be realized using any one of a number of components apparent to skilled artisans, including a brace or bracket, for example.

It should be noted that the photonic crystals may be closely spaced, such that they effectively abut one another. As illustrated, however, 110, 112, 114 and 116, are spaced sufficiently apart to enable air to separate each of the crystals. As such, the index of refraction periodically varies along the z-axis (i.e., from a photonic crystal 110 to air to second photonic 112 to air, etc.) at any point in the x-y plane within device 100.

By their configuration, each photonic crystal, 110, 112, 114 and 116, has propagating wave characteristics in the x- and the y-axes. The propagating wave characteristics of each photonic crystal may exhibit a photonic bandgap in the x-y plane. These photonic bandgaps in each plane of a periodic dielectric structure are dependent on the orientation (i.e., direction) of the propagation of the received EM energy. Consequently, the mechanically adjustable three-dimensional dielectric structure has a variable composite propagating wave characteristic, which may include a photonic bandgap in the x-y, y-z and x-z planes, depending on the vector of the received EM energy.

According to the present invention, in contradistinction with the known approach of stretching or heating a periodic dielectric structure to derive a desired propagating wave characteristic, each grouping of photonic crystals is movable with respect to the other grouping of photonic crystals. The movement of each grouping of photonic crystals may be realized in the x-, y- and/or z-directions. Each grouping of photonic crystals may be positioned, moved or rotated with respect to the other grouping. As such, the propagating wave characteristics of device 100 may be altered by varying the position and angular arrangement of the mechanically adjustable three-dimensional dielectric structure. By mechanically adjusting the groupings of photonic crystals, the propagating wave characteristics of device 100 are altered. In so doing, the propagation wave characteristics of the received EM energy may be modified (i.e., varying the attenuation of bands of EM energy propagation through device 100). Moreover, depending on the direction and orientation of the received EM energy, the composite propagating wave characteristic may include a photonic bandgap. Consequently, device 100 may selectively suppress particular wavelength bands of EM energy propagating in the direction of the varied photonic bandgap, while allowing other wavelength bands to propagate through device 100 according to the composite propagating wave characteristic.

In one example of present invention, photonic crystals, 110, 112, 114 and 116, are each rotatable about an axis 150 in the direction of the received EM energy (i.e., the z-axis). Here, rotating one grouping of photonic crystals with respect to the other grouping modifies propagating wave characteristics of device 100. The first and second coupling means, 130 and 140, are realized and shaped to enable full rotation of photonic crystals 110 and 114, with respect to photonic crystals 112 and 116. Photonic crystals, 110, 112, 114 and 116, may also have rounded comers (not shown) to facilitate full rotation. The degree of relative rotation of the groupings of photonic crystals corresponds with the propagation of certain wavelength bands, as well as the suppression of other wavelength bands from received EM energy. As such, the rotational movement of device 100 tunably filters received EM energy.

The positioning, moving or rotating of each grouping of photonic crystals within device 100 may be realized by various means known to skilled artisans upon reviewing the instant disclosure. These means include (not shown), including, for example, a motor or piezoelectric element. Moreover, a feedback loop may also be incorporated to insure the arrangement of each grouping of photonic crystals creates the desired propagating wave characteristics.

Figure 3A:
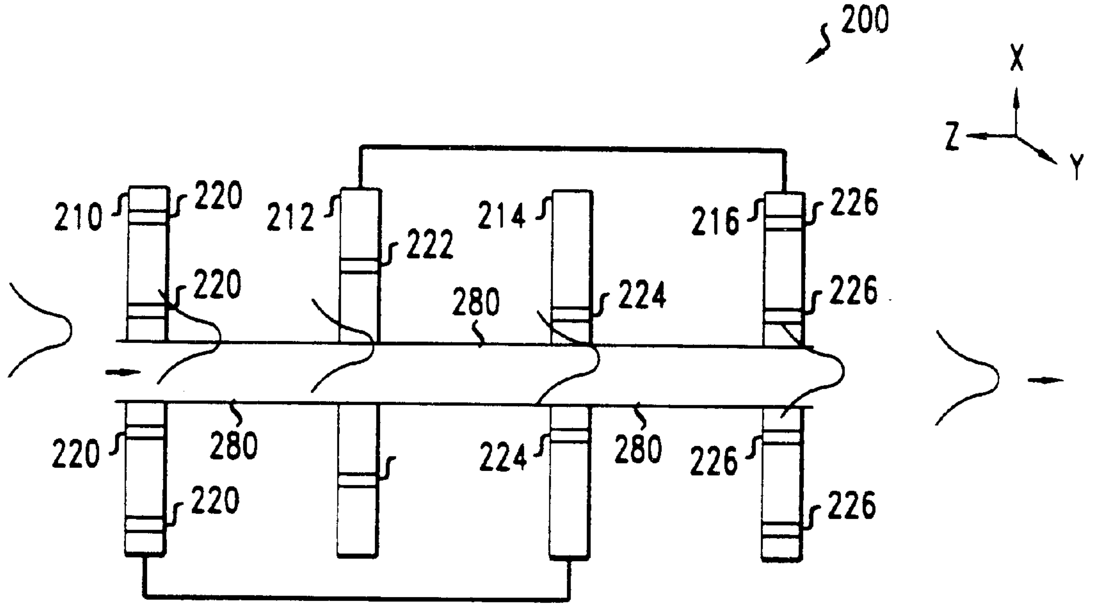
FIGS. 3(*a*) is an exploded cross-sectional view and FIG. 3(*b*) is a perspective view of a second embodiment of the present invention.
Figure 3B:
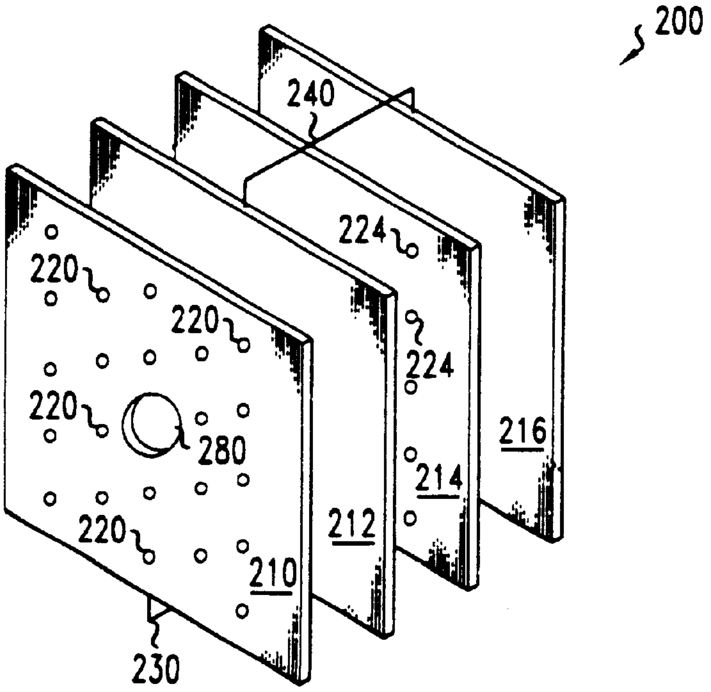

Referring to FIGS. 3(*a*) and 3(*b*), a second embodiment of the present invention is illustrated. Here, a tunable waveguide 200 is shown for shaping the mode of a received pulse of EM energy. Tunable waveguide 200 comprises a three-dimensional dielectric structure having a composite propagating wave characteristic, as generally disclosed hereinabove with respect to device 100 of FIGS. 2(*a*) and 2(*b*). This three-dimensional dielectric structure is mechanically adjustable to alter the composite propagating wave characteristic and the diffractive properties of tunable waveguide 200. By altering the propagating wave characteristics, the characteristics of the propagating mode within a waveguide of tunable waveguide 200 may be changed. These characteristics include, but are not limited to mode shape, effective index of propagation, chromatic dispersion, and polarization.

Tunable waveguide 200 shapes the mode of a received pulse of EM energy by employing at least two proximately spaced photonic crystals formed around a waveguide 280. As illustrated, tunable waveguide 200 comprises four (4) photonic crystals 210, 212, 214 and 216, each of which is aligned to be rotated about waveguide 280. The photonic crystals of tunable waveguide 200 each comprise periodic variations in their x and y-axes, as well as a non-periodic defect or channel through which waveguide 280 is formed. Consequently, the characteristics of the propagating mode of a received pulse propagating through waveguide 280 may be altered in response to the relative position of photonic crystals, 210, 212, 214 and 216— for example, the EM pulse propagating through waveguide 280 may be shaped in both the longitudinal and transverse planes.

The periodic two-dimensional variations of photonic crystals, 210, 212, 214 and 216, may be realized by a number of periodically spaced scattering elements, defects, cavities or voids, 220, 222, 224 and 226, formed within a respective substrate. To realize the variable diffractive properties of device 200, the shape, spacing and dimensions of each of the scattering elements, defects, cavities or voids, 120, 122, 124 and 126, is generally on the order of the wavelength of the pulse of EM energy received. The number, spacing and arrangement of the periodically spaced scattering elements, defects, cavities or voids, 220, 222, 224 and 226, are readily determinable to skilled artisans to derive a desired propagating wave characteristic for device 200.

The scattering elements, defects, cavities or voids, form an array in the x-y plane of each photonic crystal. For exemplary illustrations, see FIGS. 4(*b*) and 4(*c*). The array of scattering elements, defects, cavities or voids may be arranged to form a circular, rectangular or hexagonal configuration, for example. Moreover, the scattering elements, defects, cavities or voids of the array may be identically realized by any one of a number of shapes— i.e., a circle, rectangle or hexagon, for example.

Photonic crystals 210, 212, 214 and 216, may have identical periodic variations in the x- and y-axes such that their structures are equivalent. However, alternate arrangements are also employable. As shown, tunable waveguide 200 comprises two groupings of photonic crystals having identical periodic variations in the x- and y-axes. In forming the mechanically adjustable three-dimensional dielectric structure, the groupings are periodically sequenced. As such, tunable waveguide 200 includes a first grouping of photonic crystals, 210 and 214, having identical periodic variations, as well as a second grouping of photonic crystals, 212 and 216, having identical periodic variations. The photonic crystals of each grouping move in unison when tunable waveguide 100 is mechanically adjusted. Consequently, the mechanically adjustable three-dimensional dielectric structure is also periodic in the z- axis within the array of scattering elements, defects, voids or cavities. Each grouping of photonic crystals is moved in unison by the inclusion of a first and second coupling means, 230 and 240. First and second coupling means, 230 and 240, may be realized using any one of a number of components apparent to skilled artisans, including a brace or bracket, for example.

By their configuration, each photonic crystal, 210, 212, 214 and 216, has propagating wave characteristics in the x- and the y-axes. The propagating wave characteristics of each photonic crystal may exhibit at least one photonic bandgap in the x-y plane. These photonic bandgaps are dependent on the mode of propagation of the received EM energy. Consequently, the mechanically adjustable three-dimensional dielectric structure has a variable composite propagating wave characteristic, which may include a photonic bandgap in the x-y, y-z and x-z planes, depending on the vector and mode of the received pulse of EM energy.

According to the present embodiment, each grouping of photonic crystals is movable with respect to the other grouping of photonic crystals around waveguide 280. However, it should be apparent that the movement of each grouping of photonic crystals may also be realized in the x-, y- and/or z-directions. As such, the composite propagating wave characteristic of tunable waveguide 200 may be altered by varying the position and angular arrangement of the mechanically adjustable three-dimensional dielectric structure. By mechanically adjusting the groupings of photonic crystals, the composite propagating wave characteristic of tunable waveguide 200 is altered. In so doing, the shape of the mode of propagation of the received EM pulse may be modified. Moreover, depending on the direction and orientation of the received EM pulse, the composite propagating wave characteristic may include a photonic bandgap. Consequently, tunable waveguide 200 may selectively suppress particular wavelength bands of EM energy propagating in the direction of the varied photonic bandgap, while allowing other wavelength bands to propagate through tunable waveguide 200 according to the composite propagating wave characteristic.

Figure 4A:
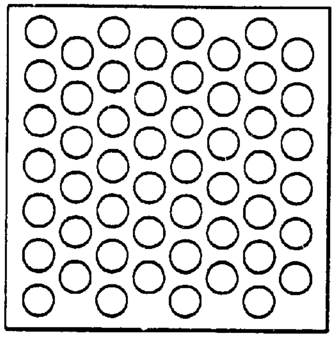
FIGS. 4(*a*), 4(*b*) and 4(*c*) are tops views of exemplary two-dimensional photonic crystals.
Figure 4B:
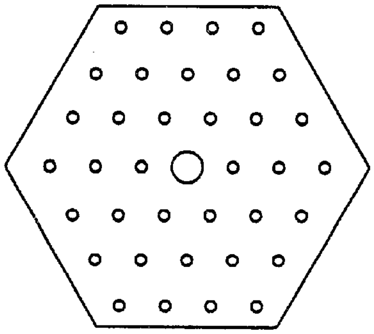
Figure 4C:
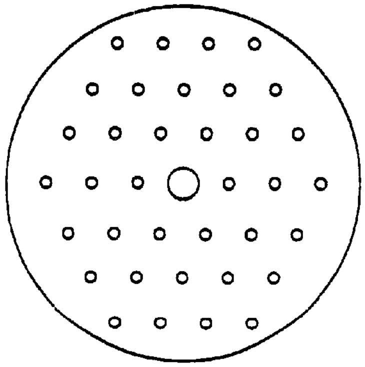

In one example of present invention, photonic crystals, 210, 212, 214 and 216, are each rotatable about waveguide 280. Here, rotating one grouping of photonic crystals with respect to the other grouping modifies composite propagating wave characteristic of tunable waveguide 200. The first and second coupling means, 230 and 240, are realized and shaped to enable full rotation of photonic crystals 210 and 214, with respect to photonic crystals 212 and 216. Photonic crystals, 210, 212, 214 and 216, may also have rounded corners, as shown in FIG. 4(*c*), to facilitate full rotation. The degree of relative rotation of the groupings of photonic crystals corresponds with the propagation of certain wavelength bands, as well as the suppression of other wavelength bands from received EM pulse. As such, the rotational movement of tunable waveguide 200 shapes the mode of the received EM pulse.

The positioning, moving or rotating of each grouping of photonic crystals within tunable waveguide 200 may be realized by various means known to skilled artisans upon reviewing the instant disclosure. These means include (not shown), including, for example, a motor or piezoelectric element. Moreover, a feedback loop may also be incorporated to insure the arrangement of each grouping of photonic crystals creates the desired propagating wave characteristics.

It should be noted that the photonic crystals of the present invention may be fabricated using various techniques known to skilled artisans. These fabrication methods include coupling a dielectric material with a multi-dimensional lattice of cavities or voids having a lower refractive index than the dielectric material. Skilled artisans will recognize that the size, shape, periodicity of the elements within each of the illustrated dielectric structures, as well as the number of dimensions having periodic variations may be modified to obtain a desired result. By executing these fabrication steps, the length scale of the periodicity of each photonic crystal is desirable smaller than the smallest wavelengths of the received EM energy. As such, the photonic crystal may be positioned, moved or rotated with respect to each other, to create periodicities at the interface between each crystal, which are greater than the periodicity for each photonic crystal. For example, if each photonic crystal comprises a glass substrate having a hexagonal array of scattering elements, defects, cavities or voids, an infinite number of periodicities are available with differing pitch.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Thus, while the photonic crystals are depicted as being periodic two-dimensional dielectric structures in forming the mechanically adjustable three-dimensional periodic dielectric structure, variations also resulting in a mechanically adjustable three-dimensional periodic dielectric structure will become apparent to skilled artisans upon review of the instant disclosure. Moreover, while the term photonic crystal is employed, the present invention is operable over wide range of frequencies, including EM energy in the visible light, microwave, and radio frequency range, for example. Similarly, the present invention is also operable with acoustic or pressure waves, not considered EM in nature. Solutions for propagating wave phenomena based on acoustic (phonon) waves result in phononic band structures much like solutions for EM (photonic) waves result in phononic band structures. It is therefore contemplated that the appended claims will cover any such modifications or embodiments as fall within the true scope of the invention.

What is claimed is:

1. A tunable device comprising:

at least a first and a second periodic dielectric structure aligned to form a composite propagating wave characteristic for controlling the propagation of electromagnetic energy, wherein one of the periodic dielectric structures is movable with respect to the other periodic dielectric structure to modify the composite propagating wave characteristic.

2. The tunable device of claim 1, wherein at least one of the first and second periodic dielectric structures comprises a multi-dimensional dielectric structure having periodic variations in at least two dimensions.

3. The tunable device of claim 2, wherein an array of scattering elements, defects, cavities or voids are periodically spaced on a first and a second axis of the periodic multi-dimensional dielectric structure.

4. The tunable device of claim 1, wherein the first periodic dielectric structure is rotated with respect to the second periodic dielectric structure for tunably steering a wavelength band of electromagnetic energy.

5. The tunable device of claim 1, wherein the moving of the first periodic dielectric structure with respect to the second periodic dielectric structure is realized by a motor or a piezoelectric element.

6. A device for tunably controlling the propagation of electromagnetic energy, the device comprising:

at least a first pair of coupled periodic dielectric structures, each periodic dielectric structure of the first pair having at least a first propagating wave characteristic; and at least a second pair of coupled periodic dielectric structures, each periodic dielectric structure of the second pair having at least a second propagating wave characteristic, wherein one pair of coupled periodic dielectric structures is aligned with the other pair of coupled periodic dielectric structure to form a resultant propagating wave characteristic for controlling the propagation of electromagnetic energy, one pair of coupled periodic dielectric structures being movable with respect to the other pair of coupled periodic dielectric structure to modify the resultant propagating wave characteristic.

7. The device of claim 6, wherein the periodic dielectric structures of the first and second pairs each have an array of scattering elements, defects, cavities or voids.

8. The device of claim 7, wherein the array of scattering elements, defects, cavities or voids are periodically spaced on a first and a second axis.

9. The device of claim 6, wherein the one pair of periodic dielectric structures is movable with respect to the other pair of periodic dielectric structures for tunably steering a wavelength band of the electromagnetic energy.

10. The device of claim 6, wherein the moving of one of the pairs of the first periodic dielectric structure with respect to the other pair of the periodic dielectric structures is realized by a motor or a piezoelectric element.

11. A method comprising:

forming a composite propagating wave characteristic by aligning a first periodic dielectric structure having at least a first propagating wave characteristic with a second periodic dielectric structure having a second propagating wave characteristic; and modifying the composite propagating wave characteristic by moving the first periodic dielectric structure with respect to the second dielectric structure.

12. A tunable waveguide comprising:

a waveguide; and at least a first and a second periodic dielectric structure aligned to around the waveguide to form a resultant propagating wave characteristic for shaping the mode of electromagnetic energy propagating through the waveguide, wherein one of the periodic dielectric structures is movable with respect to the other periodic dielectric structure to modify the resultant propagating wave characteristic.

13. The tunable waveguide of claim 12, wherein at least one of the first and second periodic dielectric structures comprises a periodic multi-dimensional dielectric structure.

14. The tunable waveguide of claim 12, wherein an array of scattering elements, defects, cavities or voids are periodically spaced on a first and a second axis of the periodic multi-dimensional dielectric structure.

15. The tunable waveguide of claim 12, wherein the first periodic dielectric structure is rotated with respect to the second periodic dielectric structure for shaping the mode of electromagnetic energy propagating through the waveguide.

16. The tunable waveguide of claim 12, wherein the moving of the first periodic dielectric structure with respect to the second periodic dielectric structure is realized by a motor or a piezoelectric element.

* * * * *